(12) United States Patent
Galtie et al.

(10) Patent No.: US 12,316,683 B2
(45) Date of Patent: May 27, 2025

(54) ARCHITECTURE FOR MONITORING, ANALYZING, AND REACTING TO SAFETY AND CYBERSECURITY EVENTS

(71) Applicant: NXP B.V., Eindhoven (NL)

(72) Inventors: Franck Galtie, Plaisance du Touch (FR); Rolf Dieter Schlagenhaft, Point (DE); Andres Barrilado Gonzalez, Toulouse (FR)

(73) Assignee: NXP B.V., Eindhoven (NL)

( * ) Notice: Subject to any disclaimer, the term of this patent is extended or adjusted under 35 U.S.C. 154(b) by 327 days.

(21) Appl. No.: 18/057,212

(22) Filed: Nov. 20, 2022

(65) Prior Publication Data

US 2023/0171293 A1 Jun. 1, 2023

(30) Foreign Application Priority Data

Dec. 1, 2021 (EP) ...................................... 21306687

(51) Int. Cl.
*H04L 9/40* (2022.01)

(52) U.S. Cl.
CPC ........ *H04L 63/205* (2013.01); *H04L 63/0218* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 6,295,490 B1 | 9/2001 | Streib | |
| 7,093,168 B2 | 8/2006 | Mahoney | |
| 10,083,588 B1 | 9/2018 | Kapoor et al. | |
| 10,220,857 B2 | 3/2019 | Jones et al. | |
| 2009/0299713 A1 | 12/2009 | Miller et al. | |
| 2011/0035348 A1* | 2/2011 | Chen | G08B 25/14 709/206 |
| 2015/0089572 A1 | 3/2015 | He et al. | |
| 2018/0367561 A1 | 12/2018 | Givental et al. | |
| 2018/0370540 A1 | 12/2018 | Yousuf et al. | |
| 2019/0339684 A1 | 11/2019 | Cella et al. | |
| 2021/0179127 A1* | 6/2021 | Lopez | B60W 30/09 |

FOREIGN PATENT DOCUMENTS

| | | |
|---|---|---|
| EP | 3057742 B1 | 12/2019 |
| WO | WO-2020/131611 A1 | 6/2020 |
| WO | WO-2020/205597 A1 | 10/2020 |

OTHER PUBLICATIONS

Feltus, Christophe et al; "A Security Decision-Reaction Architecture for Heterogeneous Disbributed Network"; Int'l Conf. on Availabity, Reliability, and Security (Feb. 2010).

(Continued)

*Primary Examiner* — Syed A Roni

(57) ABSTRACT

An architecture for monitoring, analyzing, and reacting to safety and cybersecurity events has been disclosed. In at least one embodiment, a method for processing safety and security events of a system includes requesting a reaction or escalating an effect from a first controller of the system to a second controller of the system based on a subset of available reactions for a current context of the system, constraint information, a predetermined effect-reaction policy, and the effect.

14 Claims, 12 Drawing Sheets

(56) References Cited

OTHER PUBLICATIONS

Gorelik, Kirill et al; "Optimal, Adaptive and Predictive Real-Time Control of Fail-Operational Powertrain for Automated Electric Vehicles"; IEEE Transportation Electrification Conference and Expo, Long Beach, CA, USA, Conference Paper; IEEE; 8 pages (Jun. 2018).

Sheikh, Rami et al; "Value Prediction for Security (VPsec): Countering Fault Attacks in Modern Microprocessors"; IEEE Symposium on Hardware Oriented Security and Trust (HOST), Washington, DC, USA; 4 pages (Apr. 2018).

* cited by examiner

ARCHITECTURE FOR MONITORING, ANALYZING, AND REACTING TO SAFETY AND CYBERSECURITY EVENTS

CROSS-REFERENCE TO RELATED APPLICATIONS

This application claims the priority under 35 U.S.C. § 119 of European patent application no. 21306687.1, filed Dec. 1, 2021 the contents of which are incorporated by reference herein.

BACKGROUND

Field of the Invention

The invention is related to electronic systems and more particularly to electronic systems having safety or cybersecurity events.

Description of the Related Art

In general, safety and cybersecurity related systems use separate fault collection units and threat analysis units to collect events and decide reactions to those events. However, typical fault collection units are unable to predict faults and are central units that only have an effect for reactions of last resort. Under some circumstances, the reaction selected by a fault collection unit or threat analysis unit is not appropriate for the current context of the system. In addition, conflicts between different domains of expertise may occur when handling and reacting to unexpected events in a system, e.g., in terms of the decision of the reaction and the time it takes to implement that decision. Accordingly, improved techniques for monitoring, analyzing, and reacting to safety and cybersecurity events are desired.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The use of the same reference symbols in different drawings indicates similar or identical items.

DETAILED DESCRIPTION

A safety and security monitoring, analyzing, and reacting architecture (SMARA) core (i.e., SMARA controller) includes a single decision element that monitors and reacts to safety and cybersecurity events. The SMARA core is aware of a system context and reacts accordingly. In at least one embodiment, the SMARA core reacts to predicted undesired events (e.g., faults, cybersecurity threats, and cybersecurity alarms). An embodiment of hierarchical system of SMARA cores partitions a target system into subsystems and permits degraded behavior of the target system. In at least one embodiment, a hierarchical system of SMARA cores is incorporated into a vehicular system including multiple subsystems, such as propulsion, battery management, vehicle dynamics (e.g., steering or braking), engine management, airbag control, and cabin experience subsystems. In at least one embodiment, one or more SMARA cores is included in a system on a chip (SoC) and is associated with a set of subsystem resources including one or more architectural subblocks, e.g., communication peripherals, computational elements, memory elements, etc.

Figure 1A:
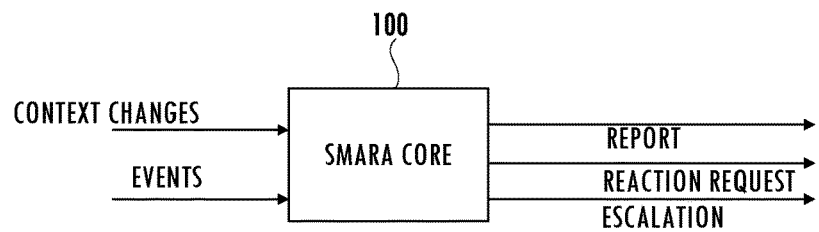
FIGS. 1A and 1B illustrate functional block diagrams of a safety and security monitoring, analyzing, and reacting architecture (SMARA) core consistent with at least one embodiment of the invention.
Figure 2A:
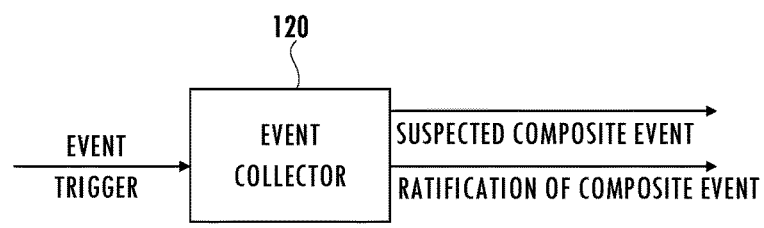
FIG. 2A illustrates a functional block diagram of an event collector of the SMARA core of FIG. 1B consistent with at least one embodiment of the invention.
Figure 1B:
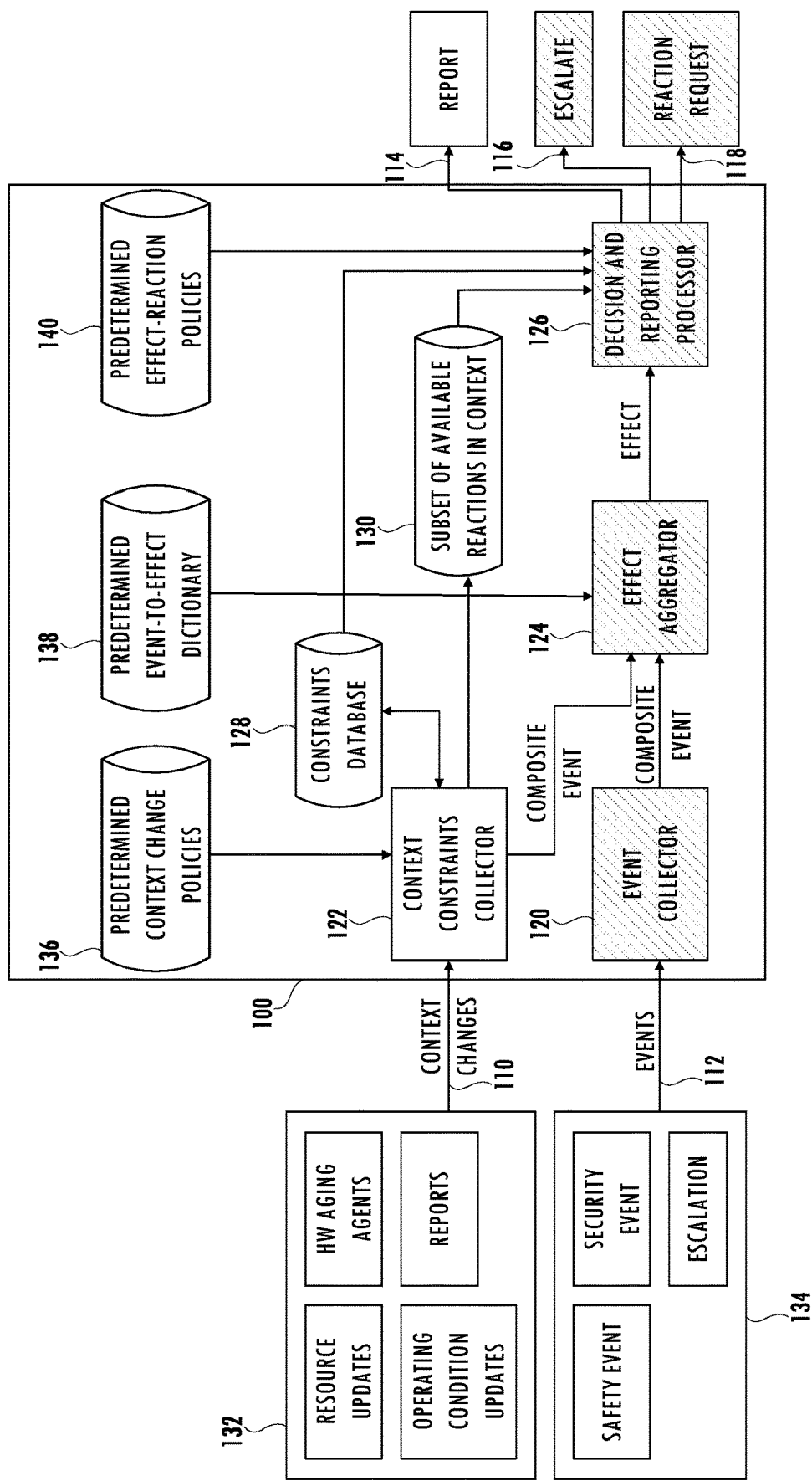

Referring to FIGS. 1A and 1B, an exemplary SMARA core receives context changes and events from system monitors (e.g., sensors) associated with a corresponding system controller (e.g., a sub-system or central control system). Exemplary context changes include changes to vehicle speed, system temperature, driving mode (e.g., engaged in parking, highway driving, driving in a pedestrian zone, driving in a city, driving off-road, battery charging, etc.), environmental conditions (e.g., weather or air temperature), location of vehicle (e.g., parked at home or parked at large public event), speed, or driving control mode (e.g., autonomously controlled or driver-controlled). A system monitor may be related to safety or related to cybersecurity (e.g., attacks to odometer, engine tuning, steering, etc. that may introduce a hazard situation). For example, a safety mechanism monitors motor control voltages and detects under-voltage events or over-voltage events that may affect motor control. Exemplary cybersecurity events include over-the-air updates of system software, or corruption of updates.

In general, an event is a dynamic input that is time-critical e.g., has a relatively fast rate of change or is related to an unexpected system condition that needs a prompt reaction (e.g., generate control signals for sensors, actuators, or peripherals). In general, a context change is a dynamic input that is not time-critical, i.e., is not urgent or has a relatively slow rate of change. The SMARA core receives the dynamic inputs and determines whether to generate an output reaction or escalation.

In at least one embodiment, the SMARA core provides three types of outputs: reports, reactions, and escalations. If the SMARA core can react locally within a corresponding subsystem, then the SMARA core generates a reaction request. An exemplary reaction request identifies a type of reaction, the SMARA core requesting the reaction, a target function or subsystem that is requested to react (e.g., perform a change in function), and a payload for the request. If the SMARA core is unable to react locally within the corresponding subsystem, then the SMARA core escalates the dynamic event or selected effect associated with the dynamic event to another SMARA core or subsystem. In either case, the SMARA core reports information associated with the dynamic input. In at least one embodiment, reports are inputs to another SMARA core and may provide context changes for that other SMARA core.

In at least one embodiment, SMARA core 100 stores predetermined, application-specific data in predetermined context change policies 136, which encodes a set of rules on how to react to operational context changes, predetermined event-to-effect dictionary 138, which includes a collection of key-value pairs, each key being mapped to an associated value, and predetermined effect-reaction policies 140, which encodes a set of rules on how to react to dynamic events. In an embodiment, predetermined context change policies 136, predetermined event-to-effect dictionary 138, and predetermined effect-reaction policies 140 are implemented using a Python dictionary, a data structure stored in RAM, a hardware look-up table, or other storage technique. In an embodiment of a SMARA core included in an SoC, storage is implemented using non-volatile memory, e.g., registers, or firmware.

Event collector 120 filters events 112 received from safety and cybersecurity monitors 134. In at least one embodiment, event collector 120 receives events 112 from asynchronous sources and filters the event inputs to generate a manageable number of events. For example, event collector 120 groups a burst of events as a single composite event to prevent or reduce reactions to false alarms or transient faults and provides that composite event to effect aggregator 124. A composite event refers to a series of events that have been filtered into a single event. In at least one embodiment, an event input provides an event identifier, an indication of a type of event, and identifies a source of the event.

In at least one embodiment, in addition to receiving inputs from safety and cybersecurity monitors 134, event collector 120 receives escalation events from another SMARA core. Event collector 120 filters the inputs and groups events (e.g., logical ORs them) to generate a composite event and provides the information to effect aggregator 124. In at least one embodiment event collector 120 provides an early warning (e.g., a predicted or suspected composite event) to the rest of SMARA core 100 when timing is critical and event collector 120 indicates that a composite event is valid by asserting a ratification signal. Event collector 120, effect aggregator 124, and decision and reporting processor 126 generate outputs (escalations 116 or requests for reaction execution 118) that are time-critical, as illustrated by shading in FIG. 1B.

Figure 1C:
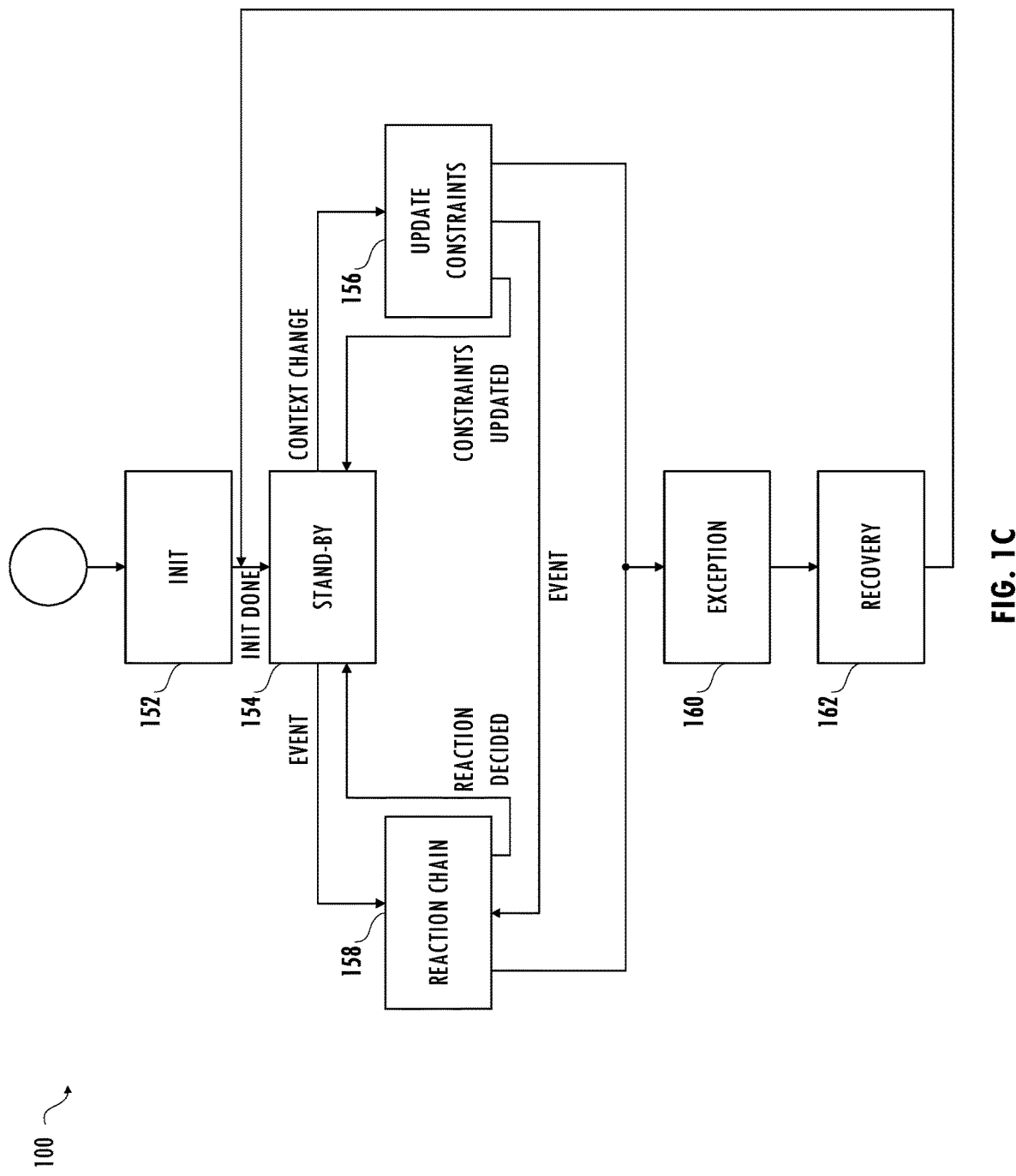
FIG. 1C illustrates an exemplary information and control flow for the SMARA core of FIGS. 1A and 1B consistent with at least one embodiment of the invention.

Referring to FIGS. 1A, 1B, and 1C, in at least one embodiment, an exemplary state machine for SMARA core 100 assumes that an event and an update of the context constraints do not occur at the same time. In other embodiments of the state machine for SMARA core 100, if an event and an update of the context constraints occur at the same time, then SMARA core 100 prioritizes the event and update of the context constraints and serializes handling of those dynamic events according to a predetermined prioritization. For example, since events are time-critical, an event is handled first and an update of the context constraints is handled later, e.g., after a predetermined time. In an embodiment, a system corresponding to SMARA core 100 has multiple modes of operation, e.g., non-operational, initializing, ready, operational when a function is enabled, a fail-safe state after a failure, or shut down after being disabled. Referring to FIG. 1C, in at least one embodiment, SMARA core 100 enters initialization state 152 from a non-operational state and enters standby state 154 after initialization. SMARA core 100 remains in standby state 154 until receiving an event or a context change. In response to an event, SMARA core 100 performs reaction chain 158, which either produces a reaction and returns to standby state 154 or enters exception state 160. After exception handling, a system corresponding to SMARA core 100 enters a recovery state 162, and then returns to stand-by state 154. In response to a context change, SMARA core 100 enters update constraints state (156) and either returns to stand-by state 154 or triggers an event and invokes reaction chain 158.

Context constraints collector 122 receives context changes, allowing context constraints collector 122 to observe the context of the system and update constraints database 128 accordingly. In an embodiment, constraints database 128 includes an operation conditions table, a customer table, a suppliers table, and a self table. The operation conditions table tracks states that are not controlled by the system that might be relevant for a reaction (e.g., vehicle moving or parked). The customer table tracks resources that might depend on the reaction decisions made by SMARA core, together with their status. The suppliers table tracks resources that report into the SMARA core to which it belongs. The self table serves as an internal memory to the SMARA core to which it belongs and tracks the latest reaction taken, and therefore, the current state of the system. Constraints collector 122 uses rules for reactions that are stored in predetermined context change policies 136 to identify a set of feasible or possible reactions to an event based on a current context of the system and stores that information in subset of available reactions in context 130.

Effect aggregator 124 receives the filtered events, determines an effect corresponding to the filtered events from predetermined event-to-effect dictionary 138 (e.g., implemented as a look-up table), and provides an effect to decision and reporting processor 126. Decision and reporting processor 126 determines an appropriate reaction based on contents of subset of available reactions in context 130, constraint information from constraints database 128, and predetermined effect-reaction policies 140. Those inputs include both safety and cybersecurity considerations. Decision and reporting processor 126 generates report 114 including corresponding information. In addition, decision and reporting processor 126 either asserts reaction request 118 or asserts escalation indicator 116.

Figure 2B:
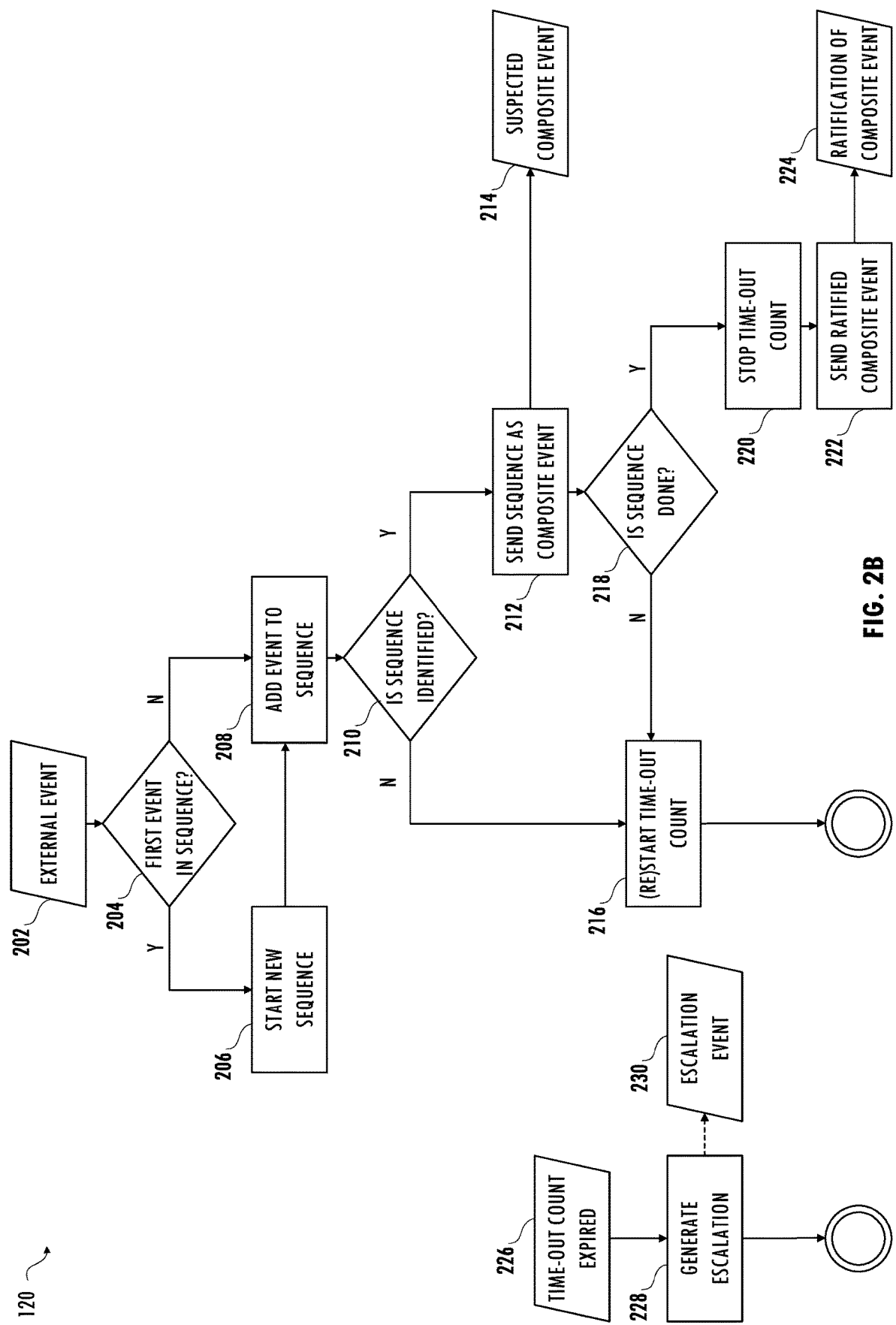
FIGS. 2B, 2C, and 2D illustrate exemplary information and control flows for the event collector of FIGS. 1B and 2A consistent with at least one embodiment of the invention.

Referring to FIGS. 1B and 2B, in at least one embodiment, event collector 120 is sequence based, i.e., a pattern of events is an input to event collector 120. In at least one embodiment, sequences are identified by comparison with a predetermined list of expected sequences and out-of-order events are filtered out. If event collector 120 reaches a time-out, then event collector 120 outputs a special ratified composite event that requests escalation.

FIG. 2B illustrates an embodiment of sequence-based event collection triggered by an external event. Event collector 120 receives the external event (202) and determines whether that external event is a first event of a sequence (204). If it is the first event of the sequence, event collector 120 starts a new sequence (e.g., using a data structure stored in memory) (206) and adds the event to the sequence (208). If the event is not the first event of a sequence, then event collector 120 adds the event to a preexisting sequence (208). If event collector 120 identifies a predetermined sequence (210), then event collector 120 determines that the sequence forms a composite event (212) and asserts a suspected composite event signal (214). If the sequence is completed (218), then event collector 120 stops a time-out counter (220), asserts a ratification of composite event signal (222), thereby ratifying the composite event (224). If the sequence is not completed (218), then event collector 120 starts or re-starts a time-out counter (216) and waits for the next external event. Meanwhile, if the time-out counter expires (226), then event collector 120 generates an escalation signal (228), thereby escalating the event (230), and event collector 120 waits for the next external event.

Figure 2C:
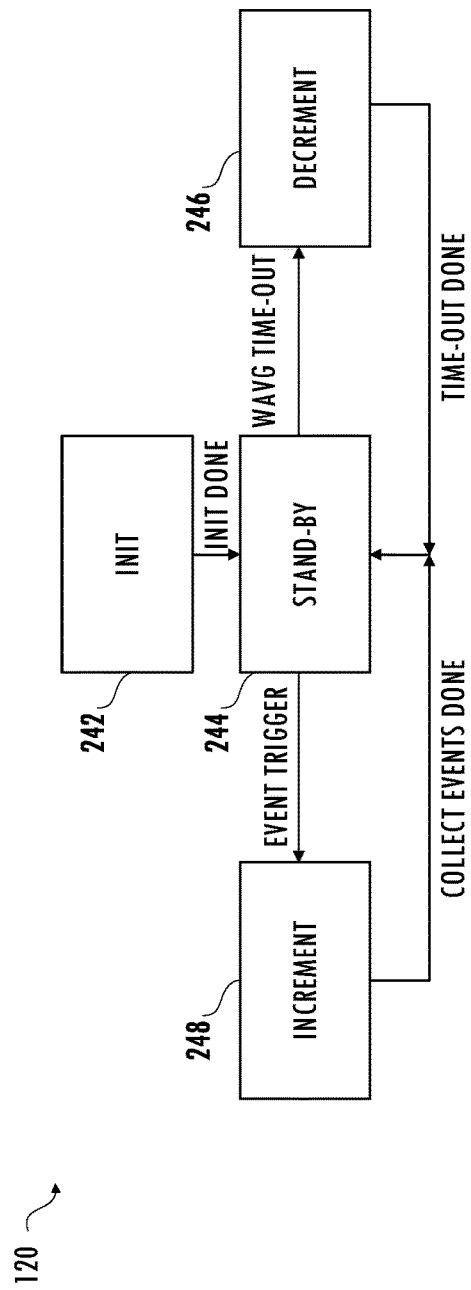

In at least one embodiment, a counter-based event collector is triggered by an external event or an internal timeout and generates a composite event. FIG. 2C illustrates an embodiment of counter-based event collection. Event collector 120 initializes (242) and enters a stand-by mode (244). Event collector 120 waits for an event or a window average (WAVG) time-out. In response to an event, event collector 120 increments the counter by N and stores the event (248), thereby updating the events log and returns to stand-by. In response to a WAVG time-out, event collector 120 decrements the counter by M and stores the event (246), thereby updating the events log and returns to stand-by. In an embodiment, M and N are integers greater than or equal to one. For example, for each event received the event count is incremented by N=2 and for each second elapsed without an event, the event count is decremented by M=1. If the threshold to trigger a composite event is five, three events must occur in less than two seconds or four event must occur in three seconds for the event to be validated.

Figure 2D:
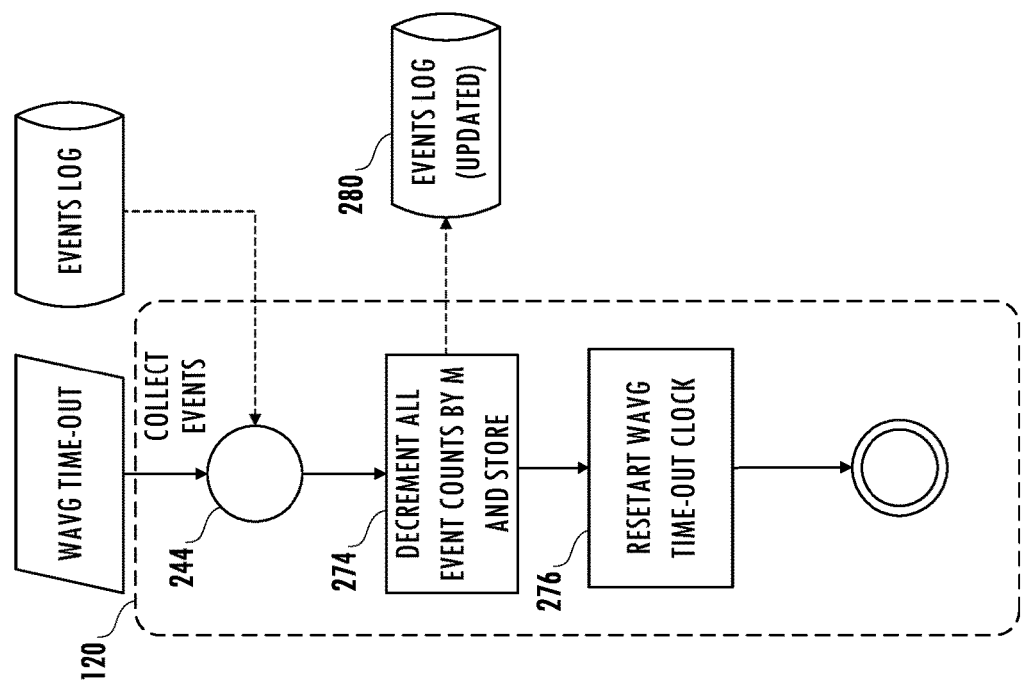
Figure 2D:
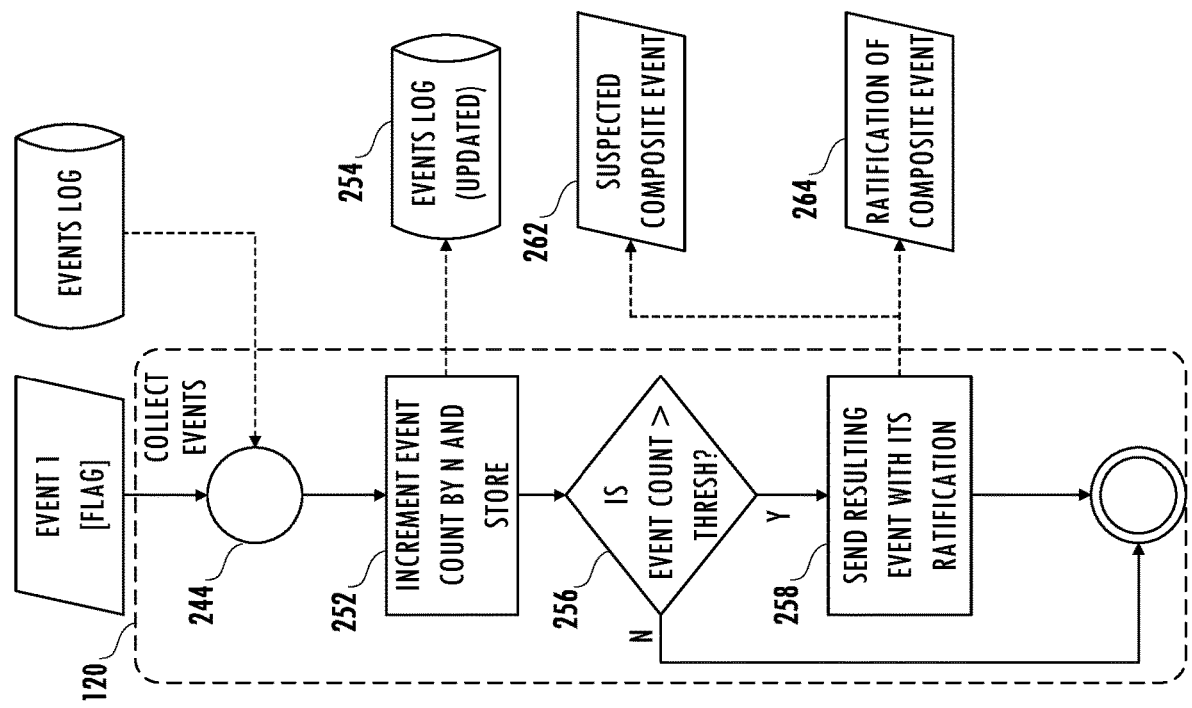

Referring to FIG. 2D, in response to an event, event collector 120 increments the counter by N and stores the event (252), thereby updating the events log (254). If the event count is greater than a threshold event count (256), then event collector 120 outputs the resulting event and asserts a corresponding ratification signal (258), thereby ratifying a suspected composite event (262) as a composite event (264). If the event count is not greater than a threshold event count (256), then event collector 120 returns to standby mode (244). In response to a WAVG time-out, event collector 120 decrements all event counts by M and stores the updated counts (274) and updates the events log (280). Event collector 120 restarts the WAVG time-out clock (276) and returns to a standby mode (244). A WAVG timeout occurs periodically to trigger an averaging function of repeated events captured in a time window.

Figure 3A:
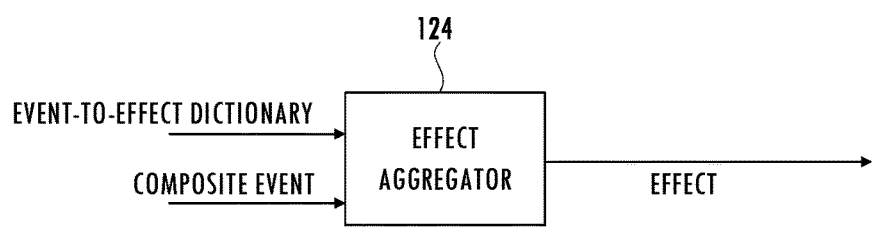
FIG. 3A illustrates a functional block diagram of an effect aggregator of the SMARA core of FIG. 1B consistent with at least one embodiment of the invention.
Figure 3B:
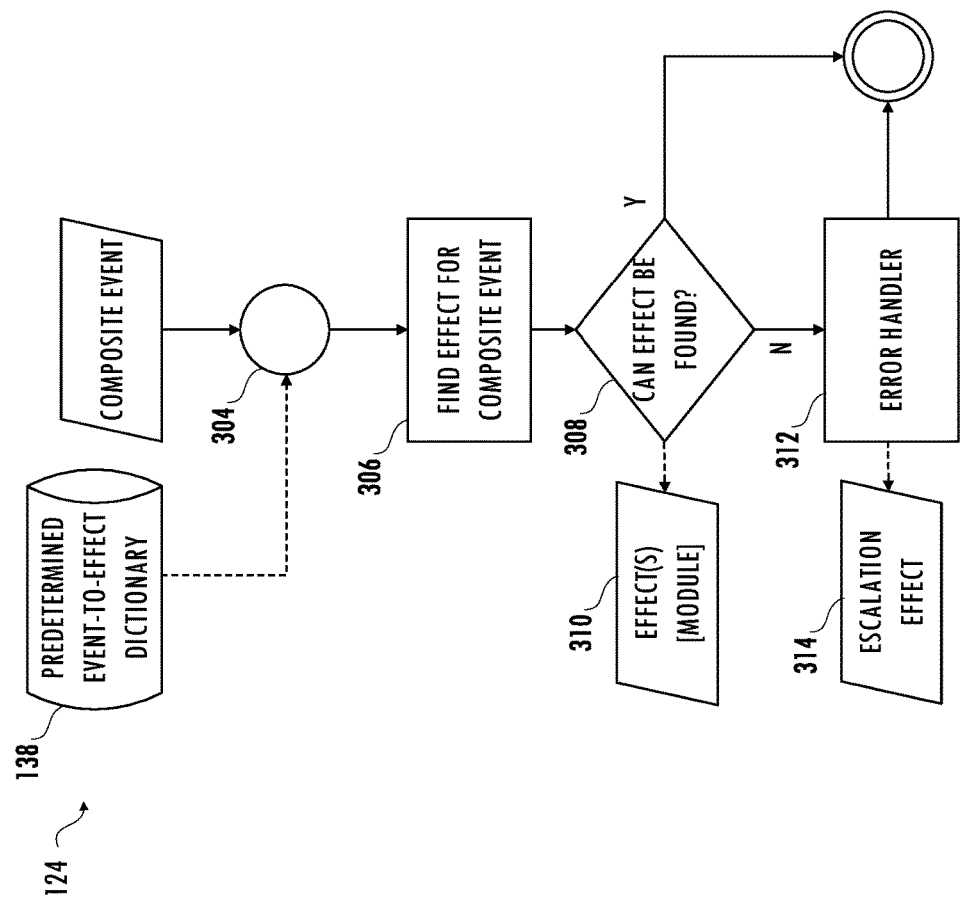
FIG. 3B illustrates an exemplary information and control flow for the effect aggregator of FIGS. 1B and 3A consistent with at least one embodiment of the invention.

Referring to FIGS. 1B, 3A, and 3B, in at least one embodiment, effect aggregator 124 receives a composite event from event collector 120 and context constraints collector 122 and looks up the event in predetermined event-to-effect dictionary 138 to identify a corresponding predetermined effect. In an embodiment, effect aggregator 124 waits until receiving a composite event (304). In response to receiving a composite event, effect aggregator accesses predetermined event-to-effect dictionary 138 to find any corresponding effect (306). If a corresponding effect is identified (308), event collector 120 provides that effect as an output (310) and returns to standby state (304). If event collector 120 does not identify a corresponding effect (308), then event collector 120 invokes an error handler (312), which escalates the dynamic event or effect associated with the dynamic event to obtain an effect (314). For example, if effect aggregator 124 receives the following composite events: (1) the power supply is in an over-voltage condition, (2) the power supply is in an under-voltage condition, and (3) voltage drift has been detected in the power supply, the event-to-effect dictionary provides a corresponding effect of "Unstable Power Supply." After this grouping, predetermined effect-reaction policies 140 and decision and reporting processor 126 react to that effect (and not to the events themselves). In an embodiment, the effect aggregator provides more than one effect: (1) "Circuit Under Stress" in response to events (1) and (3), and "Voltage Dangerously Low" in response to event (2). If decision and reporting processor 126 receives multiple effects, decision and reporting processor 126 receives different policies from reporting processor 126 and reacts according to each policy.

Figure 4A:
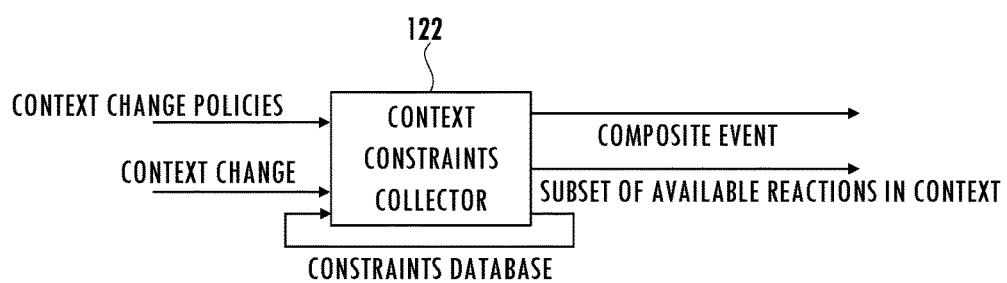
FIG. 4A illustrates a functional block diagram of a context constraints collector of the SMARA core of FIG. 1B consistent with at least one embodiment of the invention.
Figure 4B:
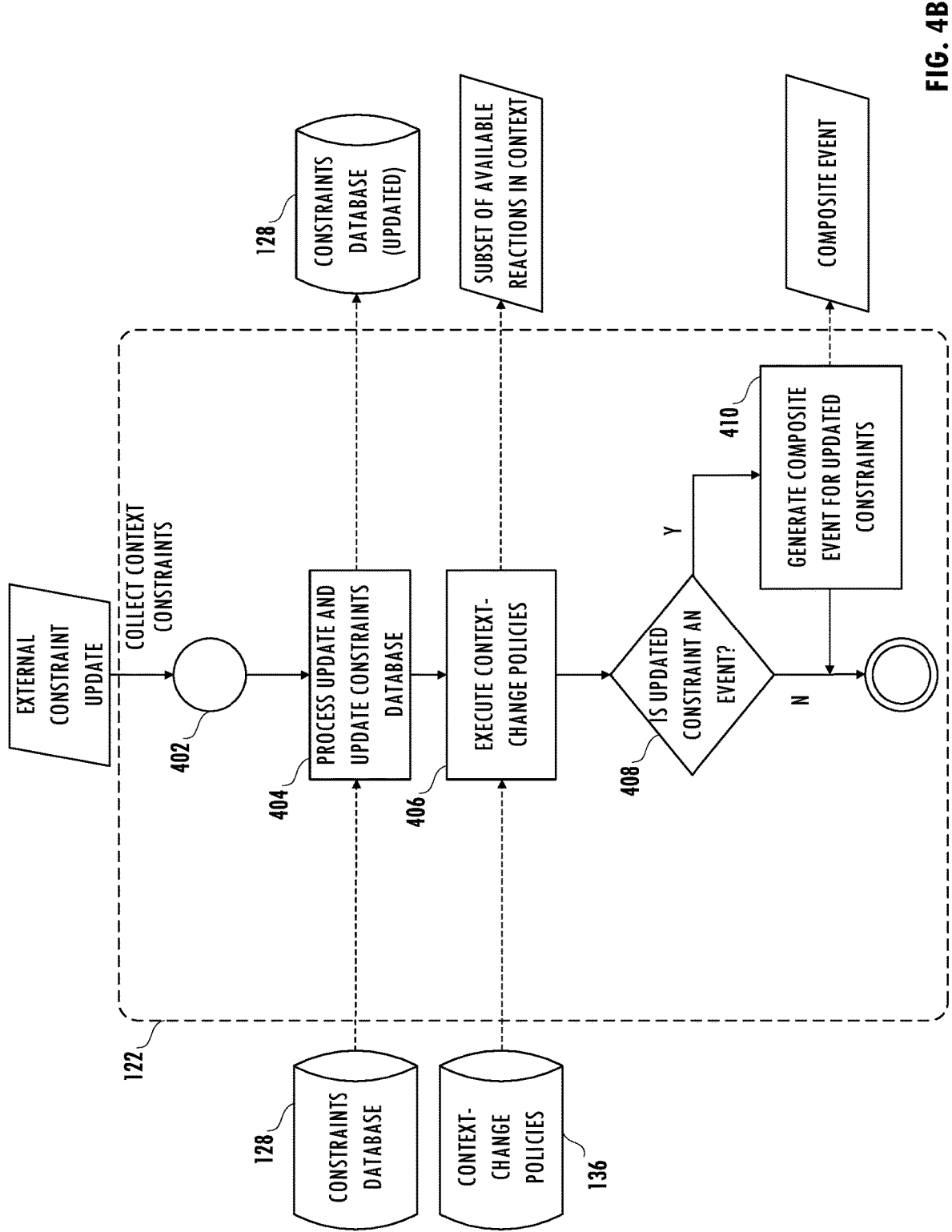
FIG. 4B illustrates an exemplary information and control flow for the context constraints collector of FIGS. 1B and 4A consistent with at least one embodiment of the invention.

Referring to FIGS. 1B, 4A, and 4B, in at least one embodiment, context constraints collector 122 waits until it receives an external constraint update (i.e., a context change) (402). Context changes 110 are non-time-critical inputs (e.g., resource updates, hardware aging updates, operating condition updates, or reports) received from elements 132. For any change in context of a system corresponding to SMARA core 100, context constraints collector 122 updates system constraints in constraints database 128 (404) and reevaluates the availability of reactions in the new context using information stored as predetermined context change policies 136 (406). In an embodiment, context constraints collector 122 returns to a standby-mode awaiting a next external constraint update after executing context-change policies (406).

In an embodiment, context constraints collector 122 provides some exception handling that supplements exception handling elsewhere in the system. For example, if context constraints collector 122 determines that the context change merits a reaction according to the predetermined context change policies (408), then context constraints collector 122 generates a composite event and stores the available reactions associated with the current context in subset of available reactions in context 130 (410). In at least one embodiment, a subset of available reactions in context includes reconfiguration according to a first profile, reconfiguration according to an Nth profile, enter a fail-safe mode of operation, enter a degraded mode of operation, or combination thereof. If context constraints collector 122 determines that the context change is not pertinent according to predetermined context-change policies 136 (408), then context constraints collector 122 returns to a standby-mode awaiting a next external constraint update. Reducing the set of possible reactions to a subset of available reactions according to the system context reduces the amount of time to execute a reaction to a context change.

Figure 5A:
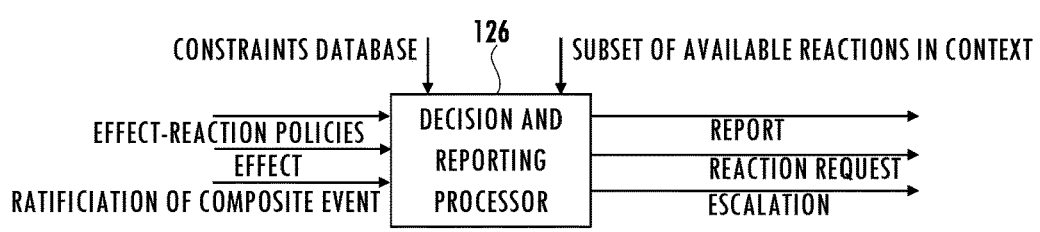
FIG. 5A illustrates a functional block diagram of a reaction decision and reporting processor of the SMARA core of FIG. 1B consistent with at least one embodiment of the invention.
Figure 5B:
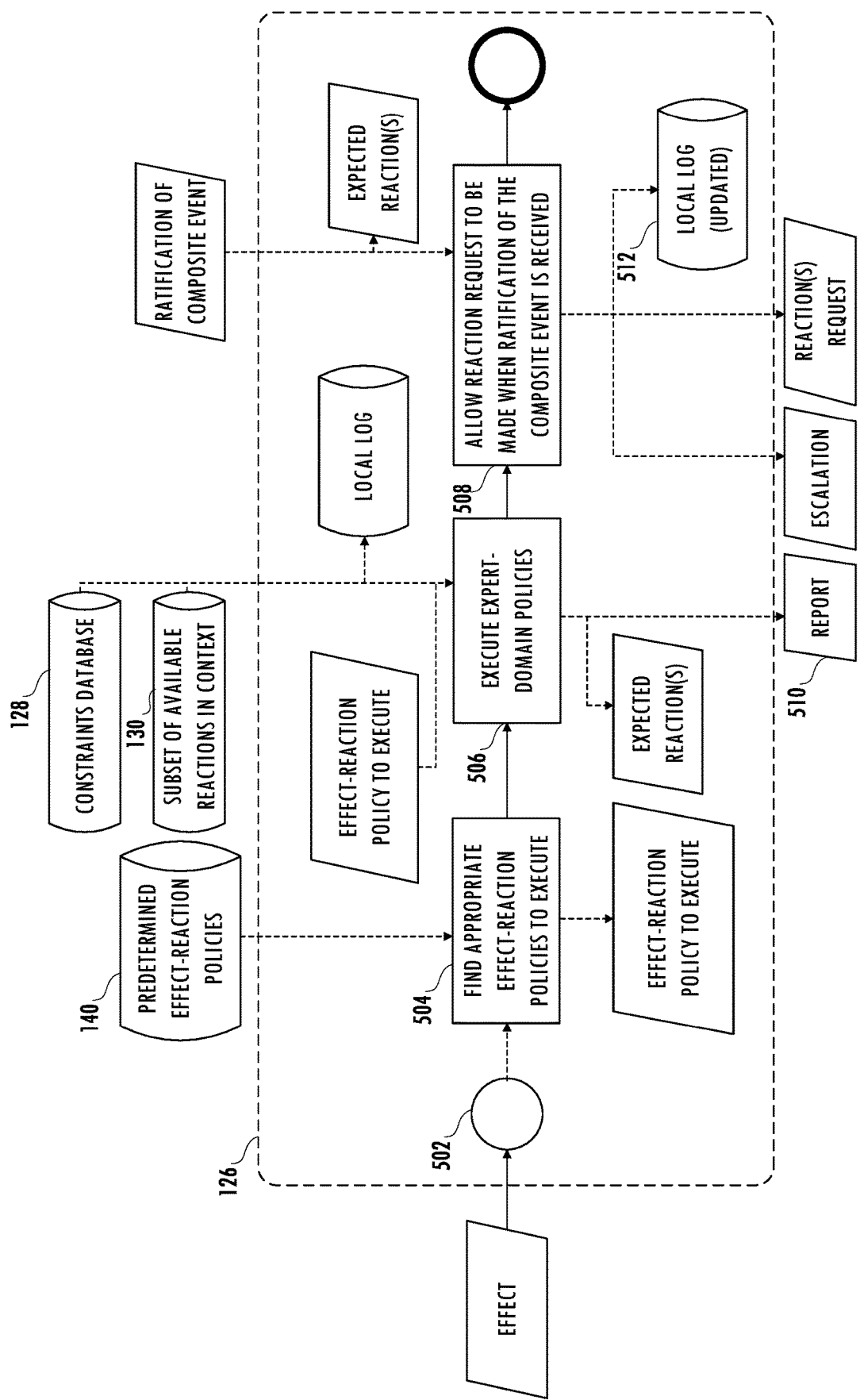
FIG. 5B illustrates an exemplary information and control flow for the reaction decision and reporting processor of FIGS. 1B and 5A consistent with at least one embodiment of the invention.

Referring to FIGS. 1B, 5A, and 5B, in at least one embodiment, decision and reporting processor 126 decides how to handle effects of composite events and reports information associated with the effects of the composite events. In an embodiment, decision and reporting processor 126 is in standby mode until receiving an effect from effect aggregator 124 (502). In response to receiving an effect, decision and reporting processor 126 consults predetermined effect-reaction policies 140, which includes safety and security-related rules, and uses information in constraints database 128, to determine appropriate effect-reaction policy to execute (504). Next, decision and reporting processor 126 consults subset of available reactions in context 130, a local log, and constraints database 128 to decide a reaction (e.g., a possible reaction or an escalation to a different SMARA core) (506). In at least one embodiment, decision and reporting processor 126 effectuates the course of action in response to a ratification of a composite event (508). Decision and reporting processor 126 reports the decision (510) and updates a local log (512). Note that any conflict between safety and cybersecurity is resolved offline (e.g., based on user analysis and user priorities) and encoded in predetermined effect-reaction policies 140.

Figure 6A:
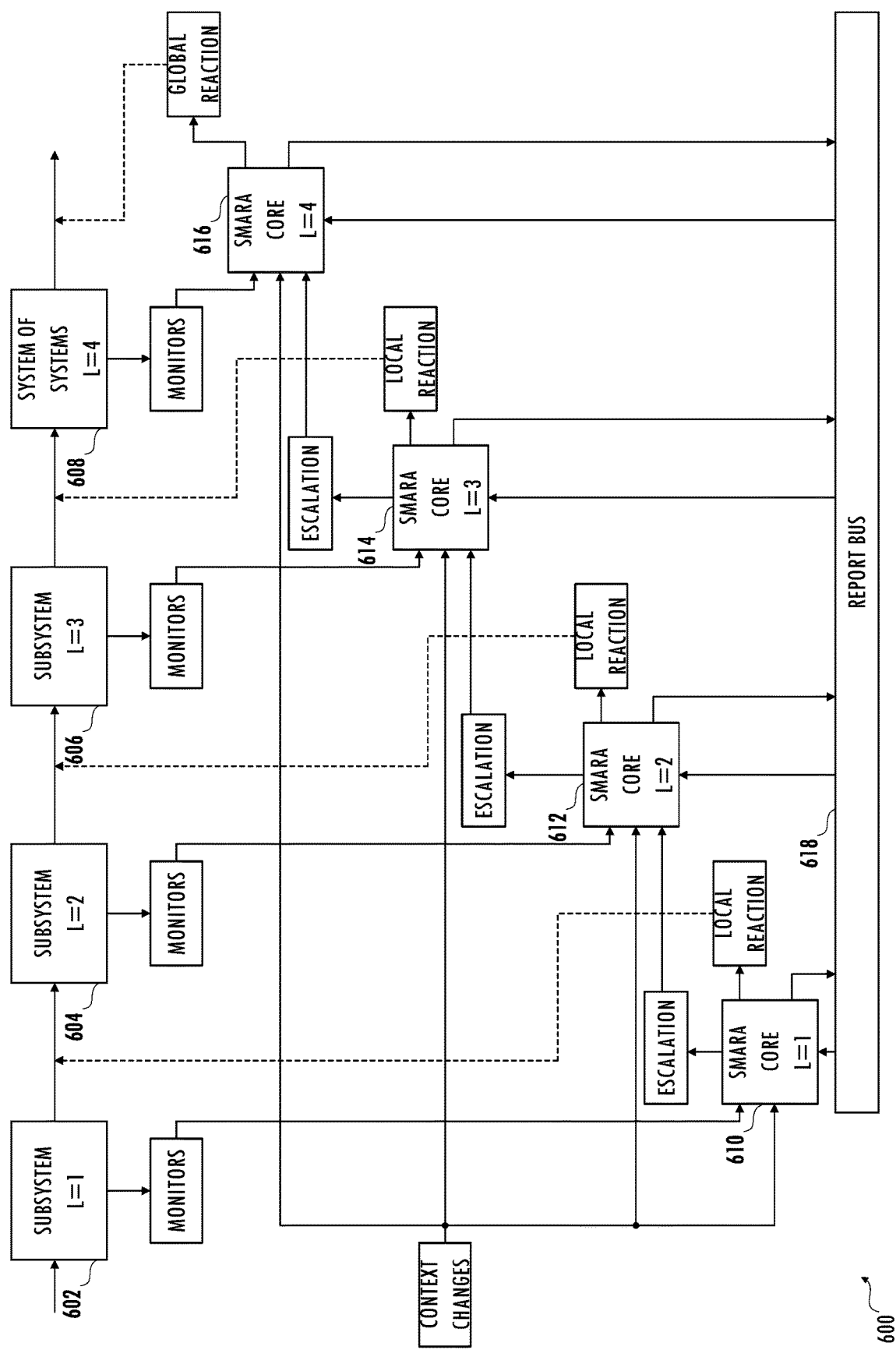
FIGS. 6A and 6B illustrate functional block diagrams of hierarchical systems of SMARA cores using direct connections between levels of SMARA cores consistent with at least one embodiment of the invention.

Referring to FIGS. 1A and 6A, in at least one embodiment, SMARA cores corresponding to subsystems of a system of systems are organized hierarchically. An instantiation of a SMARA core corresponds to each subsystem controller or subsystem resources that can initiate a recovery procedure at the level of its system of influence (e.g., propulsion/chassis controller, power management controller, autonomous driving controller, user experience controller, system controller, etc.). For example, subsystem 602, subsystem 604, subsystem 606, and system of subsystems 608 are associated with a corresponding controller or set of resources (not shown) and have associated monitors that provide events to SMARA core 610, SMARA core 612, SMARA core 614, and SMARA core 616, respectively. Each of SMARA core 610, SMARA core 612, SMARA core 614, and SMARA core 616, receives context changes from the system and reports events to report bus 618. In addition, each of SMARA core 610, SMARA core 612, and SMARA core 614 determines a local reaction in response to events and context changes or escalates the corresponding event or effect associated with the corresponding event directly as an input to a SMARA core of the next-higher level. SMARA core 616 is associated with the top-level of the hierarchy and generates a global reaction for system 600.

Figure 6B:
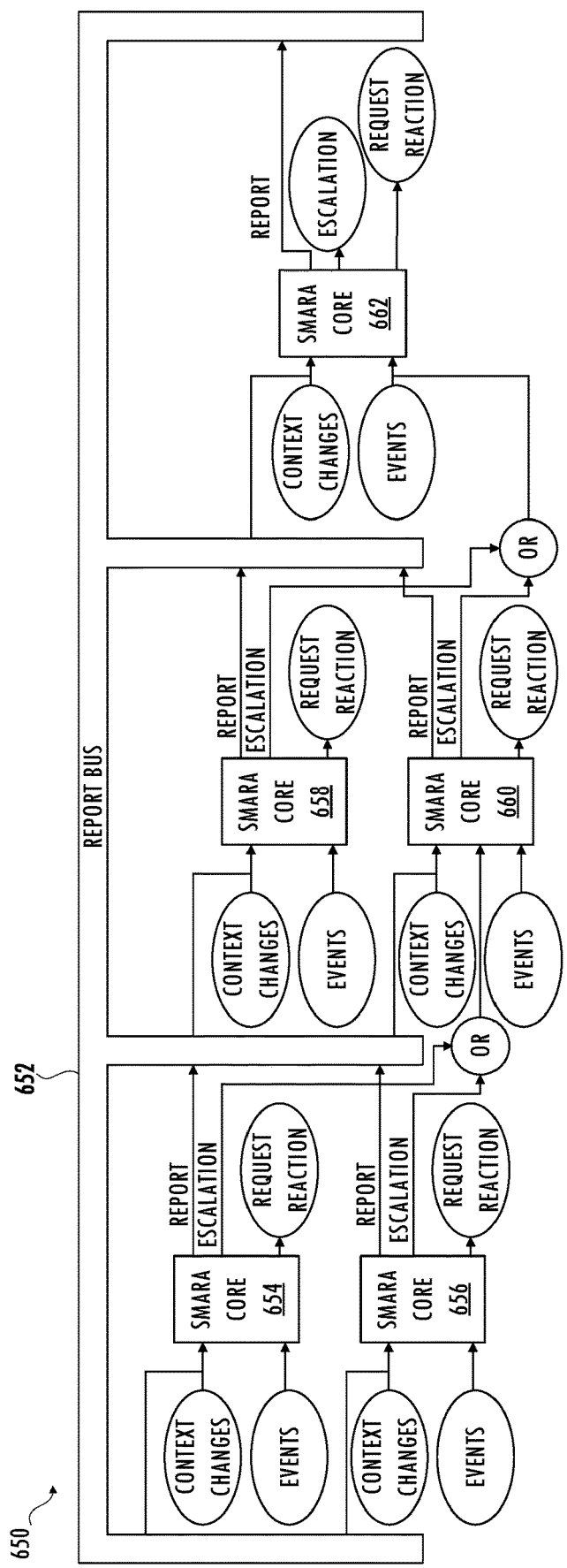

In other embodiments, SMARA cores are configured in other hierarchical arrangements. For example, FIG. 6B illustrates system 650 having a tree hierarchy of SMARA cores coupled to report bus 652. The hierarchy includes three abstraction levels with reports being shared by all SMARA cores and escalations being passed from a SMARA core in a level of the hierarchy to an input of a SMARA core in a next-higher level of the hierarchy. SMARA core 654 and SMARA core 656 are in the same hierarchical level. Any escalation from SMARA core 654 or SMARA core 656 is an input to SMARA core 660 of the next hierarchical level. Similarly, SMARA core 658 and SMARA core 660 are in the same hierarchical level. Any escalation from SMARA core 658 or SMARA core 660 is an input to SMARA core 662 of the highest level in the hierarchy.

Figure 7:
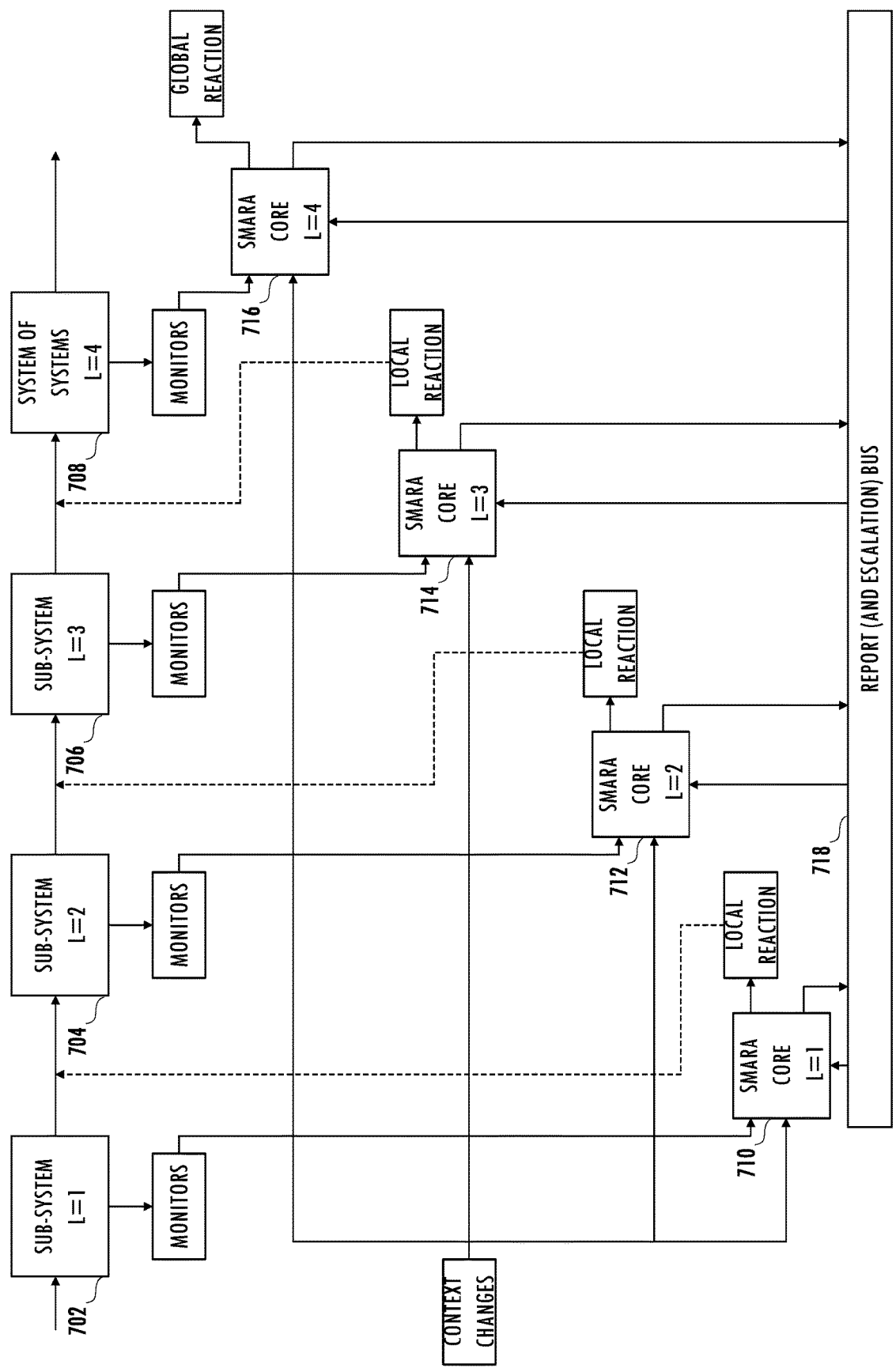
FIG. 7 illustrates a functional block diagram of a hierarchical systems of SMARA cores communicating escalation between levels of SMARA cores using a bus and SMARA core addressing consistent with at least one embodiment of the invention.

In yet other embodiments, rather than directly escalate a dynamic event or effect associated with the dynamic event from a SMARA core in a first level of the hierarchy of SMARA cores to an input of a SMARA core in a next level of the hierarchy of SMARA cores, a bus and addressing embodiment is used. For example, FIG. 7 illustrates system 700 including subsystem 702, subsystem 704, subsystem 706, and system of systems 708, each having a corresponding controller or set of resources (not shown) and having associated monitors that provide dynamic events to SMARA core 710, SMARA core 712, SMARA core 714, and SMARA core 716, respectively. Monitors provide information regarding random hardware faults, cybersecurity events, systematic failures due to software bugs, systematic failures due to hardware design bugs, predicted hardware failures due to silicon aging, expected operational context changes, unexpected operational context changes, etc. Each of SMARA core 710, SMARA core 712, SMARA core 714, and SMARA core 716, receives context changes from the system and reports events to report bus 718. In addition, each of SMARA core 710, SMARA core 712, and SMARA core 714 determines a local reaction to the events and context changes or escalates the dynamic event or associated effect indirectly by driving an escalation signal on report bus 718. SMARA core 716, which is associated with the top-level of the hierarchy, generates a global reaction, and does not escalate any dynamic event or any effect associated with a dynamic event.

In at least one embodiment, SMARA cores are used in an automotive application enable coordinated mitigation reactions from a low-component level to an upper most system level. For example, system of systems 708 provides a vehicle-level service (e.g., automated driving or electrification services) using sub-systems 702, 704, and 706. Each subsystem provides information regarding context, e.g., a wheel speed sensor and a GPS unit both provide speed information. An exemplary system includes a group of sub-functions that provide a service to an item, e.g., radar, cameras, sensors used by a vision subsystem. If the vision subsystem of an autonomous vehicle subsystem includes a multi-core radar subsystem that has a failing core, a reaction may be to use only a camera subsystem instead of the radar subsystem and the camera subsystem (e.g., operate the system in a degraded mode) or to continue to use the radar system, but mitigate by reducing number of cores used, reducing vehicle speed, etc. If the radar subsystem and the camera subsystem experience faults, autonomous driving may be completely disabled.

Structures of the SMARA core described herein may be implemented using application-specific hardware (i.e., application-specific circuits) or by software executing on a processor (which includes firmware) or by a combination of software and hardware. Software, as described herein, may be encoded in at least one tangible (i.e., non-transitory) computer readable medium. As referred to herein, a tangible computer-readable medium includes at least a disk, tape, or other magnetic, optical, or electronic storage medium.

Thus, an architecture for monitoring, analyzing, and reacting to safety and cybersecurity events has been disclosed. In at least one embodiment, a method for processing safety and security events of a system includes requesting a reaction or escalating an effect from a first controller of the system to a second controller of the system based on a subset of available reactions for a current context of the system, constraint information, a predetermined effect-reaction policy, and the effect.

In an embodiment, the method includes determining the effect based on a plurality of predetermined effects and a composite event signal.

In an embodiment, the reaction is requested or the effect is escalated in response to a ratification of a composite event signal associated with the effect.

In an embodiment, the composite event signal is based on timing-critical events.

In an embodiment, the composite event signal is further based on an escalation indicator.

In an embodiment, the method further includes reporting information based on the effect, the subset of available reactions for the current context, the predetermined effect-reaction policy, and the constraint information.

In an embodiment, the method further includes generating the composite event signal using sequence-based generation.

In an embodiment, the method further includes generating a second composite event signal and an indication of the subset of available reactions corresponding to the current context based on predetermined context-change policies and the constraint information in response to a change in context of the system.

In an embodiment, escalating includes sending an indication of the effect by the first controller to an escalation input of the second controller in a next level of a hierarchy of controllers.

In an embodiment, escalating includes sending an escalation message and an address of a second monitor and reaction controller in a next level of a hierarchy of monitor and reaction controllers on a bus coupling multiple controllers of the system.

In at least one embodiment, a processing system for handling safety and security events of a system includes an effect aggregator configured to determine an effect. The effect is determined based on a plurality of predetermined effects based on a composite event signal. The processing system includes a reaction processor configured to request a reaction or to escalate the effect from a first controller of the system to a second controller of the system based on a subset of available reactions for a current context of the system, constraint information, a predetermined effect-reaction policy, and the effect.

In an embodiment, the reaction is requested or the effect is escalated in response to a ratification of a composite event signal associated with the effect.

In an embodiment, the composite event signal is based on timing-critical events.

In an embodiment, the composite event signal is further based on an escalation indicator.

In an embodiment, the reaction processor is further configured to report information based on the effect, the subset of available reactions for the current context, the predetermined effect-reaction policy, and the constraints information.

In an embodiment, the processing system further includes a sequence-based timing-critical events filter configured to generate the composite event signal.

In an embodiment, the processing system further includes a context constraint filter configured to generate a second composite event signal and an indication of the subset of available reactions corresponding to the current context based on context-change policies and the constraint information in response to a change in context of the system.

In at least one embodiment, a method for processing safety and security events of a system includes escalating an effect from a first controller of a first level of a hierarchical control system to a second controller of a second level of the hierarchical control system based on a subset of available reactions for a current context of the system, constraint information, a predetermined effect-reaction policy, and the effect. The effect is determined based on a composite event signal. The composite event signal is based on a safety event indicator and a security event indicator.

In an embodiment, the escalating includes the first controller writing the effect and an address of the second controller to a bus coupled to each controller of the hierarchical control system.

In an embodiment, the escalating includes providing an escalation output directly from the first controller to an escalation input of the second controller.

In an embodiment, the method further includes writing a report to a reporting bus by the first controller and writing a second report to the reporting bus by the second controller.

Although the invention is described herein with reference to specific embodiments, various modifications and changes can be made without departing from the scope of the present invention as set forth in the claims below. For example, although the SMARA core system is described with reference to a vehicular system, in other embodiments, the SMARA core system is applied to other industrial applications. Accordingly, the specification and figures are to be regarded in an illustrative rather than a restrictive sense, and all such modifications are intended to be included within the scope of the present invention. Any benefits, advantages, or solutions to problems that are described herein with reference to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for processing safety and security events of a system, the method comprising:
   receiving, by a first controller at a first hierarchical level of the system, events associated with a first subsystem of a vehicle from a first monitor associated with the first subsystem;
   receiving, by a second controller at a secnd hierarchical level of the system, events associated with a second subsystem of the vehicle from a second monitor associated with the second subsystem;
   generating, by the first controller, a composite event signal by filtering and grouping the events received by the first controller from the first monitor;
   determining, by the first controller, an effect based on a plurality of predetermined effects and the composite event signal; and
   escalating, by the first contoller, the effect from the first controller to the second controller based on a subset of available reactions for a current context of the system, constraint information, a predetermined effect-reaction policy, and the effect.

2. The method as recited in claim 1, wherein the composite event signal is based on a safety event indicator and a security event indicator.

3. The method as recited in claim 1 wherein the effect is escalated in response to a ratification of the composite event signal associated with the effect.

4. The method as recited in claim 3 wherein the composite event signal is generated based on an escalation indicator.

5. The method as recited in claim 3 wherein the composite event signal is generated using sequence-based generation.

6. The method as recited in claim 1 further comprising reporting information via a report bus based on the effect, the subset of available reactions for the current context, the predetermined effect-reaction policy, and the constraint information, wherein the report bus is coupled to a plurality of controllers at a plurality of hierarchical levels of the system including the first controller at the first hierarchical level and the second controller at the second hierarchical level.

7. The method as recited in claim 1 further comprising:
generating a second composite event signal and an indication of the subset of available reactions corresponding to the current context based on predetermined context-change policies and the constraint information in response to a change in context of the system.

8. The method as recited in claim 1 wherein escalating includes s ending an indication of the effect by the first controller to an escalation input of the second controllers.

9. A processing system for handling safety and security events of a system comprising:
- a first controller at a first hierarchical level of the system, the first controller being associated with a first subsystem of a vehicle; and
- a second controller at a second hierarchical level of the system, the second controller being associated with a second subsystem of the vehicle,
- wherein the first controller is configured to:
  - receive events associated with the first subsystem from a first monitor associated with the first subsystem,
  - generate a composite event signal by filtering and grouping the events received from the first monitor,
  - determine an effect, the effect being selected from a plurality of predetermined effects based on the composite event signal, and
  - escalate the effect from the first controller of the system to the second controller of the system based on a subset of available reactions for a current context of the system, constraint information, a predetermined effect-reaction policy, and the effect.

10. The processing system as recited in claim 9 wherein the effect is escalated in response to a ratification of the composite event signal associated with the effect.

11. The processing system as recited in claim 9 wherein the composite event signal is based on timing-critical events.

12. The processing system as recited in claim 9 wherein the composite event signal is further based on an escalation indicator.

13. The processing system as recited in claim 9 wherein the first controller is further configured to report information over a report bus coupled to at least the first controller and the second controller based on the effect, the subset of available reactions for the current context, the predetermined effect-reaction policy, and the constraints information.

14. The processing system as recited in claim 9, wherein the first controller further comprises:
- a context constraint filter configured to generate a second composite event signal and an indication of the subset of available reactions corresponding to the current context based on context-change policies and the constraint information in response to a change in context of the system.

* * * * *